United States Patent [19]

Cianciolo et al.

[11] Patent Number: 4,476,251

[45] Date of Patent: Oct. 9, 1984

[54] POLYURETHANE FOAM HAVING CLEANING AND GERMICIDAL ACTIVITIES

[75] Inventors: Alfred D. Cianciolo, West Haven; Ellwood L. Lines, Jr., New Haven, both of Conn.

[73] Assignee: Olin Corporation, New Haven, Conn.

[21] Appl. No.: 547,612

[22] Filed: Nov. 1, 1983

[51] Int. Cl.³ .............................................. C08G 18/14
[52] U.S. Cl. .................................... 521/110; 521/111; 521/112; 521/114; 521/116; 521/128
[58] Field of Search ............... 521/110, 111, 112, 114, 521/116, 128

[56] References Cited

U.S. PATENT DOCUMENTS

| | | | |
|---|---|---|---|
| 3,283,357 | 11/1966 | Decker et al. | 15/506 |
| 3,619,843 | 11/1971 | Richter et al. | 15/104.93 |
| 3,806,474 | 4/1974 | Blair | 521/159 |
| 4,160,076 | 7/1979 | Guthrie et al. | 521/159 |
| 4,220,727 | 9/1980 | Godlewski | 521/110 |

Primary Examiner—Maurice J. Welsh
Attorney, Agent, or Firm—William D. Sabo

[57] ABSTRACT

Disclosed is an improved polyurethane foam having cleaning and germicidal activities. The foam is prepared by mixing together a select prepolymer reactant and water, and adding to the mixture prior to foam formation a nonionic surfactant, a quaternary ammonium compound and a silicon-based surfactant. The resulting foam is particularly useful as a disposable wiping pad for household clean-up applications.

18 Claims, No Drawings

POLYURETHANE FOAM HAVING CLEANING AND GERMICIDAL ACTIVITIES

This invention relates to an improved polyurethane foam, and more particularly to a polyurethane foam having cleaning and germicidal activities and to a method of making the same.

In recent years, there has been a steady increase in the demand for household convenience products. To meet this demand, various disposable polyurethane foam cleaning products have been developed. Typically, the foam product contains a cleaning agent, and may in addition contain a germicidal agent, as well as various other ingredients. However, these foam products still present a number of deficiencies.

In U.S. Pat. No. 3,283,357, for example, a portion of the exterior surfaces of a polyurethane foam pad is coated with a detergent and a germicidal agent. Since the additive ingredients are applied to the surface instead of dispersed throughout the foam, these additives are readily depleted, and may even become exhausted during wetting of the product prior to use.

Another approach involves incorporating the additive agents into the cellular structure of the foam subsequent to foam formation. This has been accomplished by dispersing the selected additives in a liquid medium, such as water, and then soaking the foam in the dispersion. There are a number of disadvantages associated with this technique. One is that it requires additional process steps, namely: soaking the foam, and then removing the dispersing medium from the foam. These additional steps can be relatively costly, as the foam products are generally priced as to achieve a very low profit margin per unit sold. In addition, another limitation involves the need for using additives which are suitably dispersible in the liquid medium.

To overcome these problems, dry impregnants have also been added to polyurethane foams. In U.S. Pat. No. 3,619,843, the dry impregnant is deposited on the foam surface, and then mechanically transferred to the foam interior, such as by the use of a vacuum. However, like the other approaches discussed above, this one also requires that additional manipulative steps be performed on the foam to impart the desired properties. Another drawback is that it is generally difficult to uniformly distribute a pre-set amount of the additive ingredients throughout the foam.

Now, according to the invention, an improved polyurethane foam having cleaning and germicidal activities has been discovered which is particularly suited for such household applications. This polyurethane foam is prepared from a select reaction mixture which includes a nonionic surfactant, a quaternary ammonium compound and a silicon-based surfactant. Subsequent impregnation steps are avoided, as the desired active ingredients are incorporated directly into the reaction mixture prior to foam formation. Activity levels are effectively controlled, and the active ingredients are distributed substantially uniformly throughout the resulting cellular structure. In addition, a fine cell structure is achieved, which leads to a desirable metered release of the active ingredients during use of the polyurethane foam product.

In preparing the polyurethane foam of the present invention, a select hydrophilic prepolymer is reacted with water. The prepolymer employed according to the invention is a hydrophilic oxyalkylene polyol which is capped with isocyanate groups. The prepolymer is made, for example, by reacting toluene diisocyanate with a polyalkylene glycol and a polyhydric alcohol containing 3 or 4 hydroxyl groups per molecule. In forming the prepolymer, sufficient polyisocyanate is used so as to insure complete capping of all the hydroxyl groups. Various prepolymers of this type are commercially available from W. R. Grace & Co. under the designation "HYPOL". In one particularly preferred embodiment of the invention, "HYPOL 3000" is employed.

As noted above, the prepolymer which is employed is hydrophilic, i.e. in the prepolymer backbone, usually at least about 40 mole percent of the oxyalkylene units are oxyethylene units, the balance being oxypropylene, oxybutylene or other oxyalkylene units. In the resulting polyurethane foam, the branch points of the polymer chains are connected by essentially linear polyoxyalkylene chains containing at least about 40 mole percent of oxyethylene units (excluding initiators at branch points) as described above.

In accordance with the present invention, the amount of water employed can vary over a wide range. Generally speaking, however, water is typically used in a proportion ranging from about 20 to about 100, and preferably about 40 to about 80, parts per every 100 parts by weight of the prepolymer. When higher proportions of water are employed, then the resulting foam may demonstrate insufficient strength. On the other hand, as the quantity of water is reduced to a level which is too low, then the foaming reaction may not proceed to completion.

The reaction mixture further includes a nonionic cleaning surfactant, a quaternary ammonium compound and a silicon-based surfactant. Any suitable nonionic surfactant known to those skilled in the art may be employed. Typical nonionic surfactants include the following and mixtures thereof: fatty alkanolamides; fatty alcohol ethylene oxide; polyoxyethylene fatty acid ester; polyethylene glycol oleate; polyoxyethylene alkyl phenol; ethanolamide fatty acid condensate; polyoxyethylene propylene glycol monostearate; iso-octyl phenoxy polyoxyethylene ethanol; nonylphenol polyglycol ether alcohol; alkylphenol ethylene oxide condensate; alkyl aryl polyether alcohol; aromatic polyglycol ether condensate; polyethylene glycol esters of fatty acids; aliphatic polyoxyethylene ether alcohol; alkoxy polyoxyethylene ethanol; polyoxyethylene ester; alkyl aryl polyethylene glycol ether; and alkyl aryl ether. A particularly preferred nonionic surfactant is an alkylphenol ethylene oxide condensate commercially available from Olin Corporation under the designation "Poly-Tergent® B-300". The nonionic surfactant is used in a proportion of about 0.5-10, and preferably about 3-7.5, parts per 100 parts by weight of the prepolymer.

Suitable quaternary ammonium compounds may be represented by the general formula:

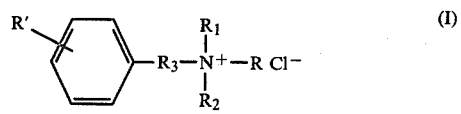

wherein $R_1$, $R_2$ and $R_3$ are independently selected from the group consisting of $C_1$-$C_4$ alkyl, $R'$ is selected from the group consisting of hydrogen and $C_1$-$C_4$ alkyl and R is selected from the group consisting of $C_8$-$C_{18}$ alkyl and preferably $C_{12}$–$C_{18}$ alkyl. In a particularly preferred embodiment of the invention, there is employed a mixture of n-alkyl ($C_{12}$–$C_{18}$) dimethyl benzyl ammonium chlorides and n-alkyl ($C_{12}$–$C_{18}$) dimethyl ethylbenzyl ammonium chlorides. One such mixture is commercially available from Onyx Chemical Company under the designation "BTC 2125M".

The quaternary ammonium compounds of general formula (I) can be readily prepared by procedures well known in the art. For example, the corresponding tertiary amine can be heated with benzyl chloride or the appropriate alkyl-substituted benzyl chloride at 60° to 80° C. In addition, the reaction can be carried out in the presence of water which tends to accelerate the reaction. See Linfield, W. M., *Cationic Surfactants*, page 30 (1970).

Other suitable quaternary ammonium compounds may be represented by the general formulas below:

(II)

wherein $R_1$ and $R_2$ are independently selected from the group consisting of $C_1$–$C_4$ alkyl and R and R' are independently selected from the group consisting of $C_6$–$C_{16}$ alkyl, and preferably $C_8$–$C_{10}$ alkyl; and

(III)

wherein $R_1$, $R_2$ and $R_3$ are independently selected from the group consisting of $C_1$–$C_4$ alkyl and R is selected from the group consisting of $C_8$–$C_{18}$ alkyl, and preferably $C_{10}$–$C_{16}$ alkyl. Illustrative compounds of general formulas II and II include dioctyldimethyl ammonium chloride and decyltrimethyl ammonium bromide, respectively.

The quaternary ammonium compound is used in a proportion of about 0.5–5, and preferably about 1.5–3, parts per 100 parts by weight of the prepolymer.

The foam-forming reaction is effected in the presence of a silicon-based surfactant which is necessary in order to prevent the foam from collapsing and further to obtain a foam having a uniform and acceptable cellular structure. For this purpose, any of the conventionally used silicon-based surfactants, such as the silicone oils and the siloxane oxyalkylene block copolymers, may be employed. Generally, however, it is preferred to employ a silicon-based surfactant that is non-hydrolyzable. Such surfactants are characterized by silicon-carbon linkages that are stable in water or water-containing pre-mixes. This stability is predicated on the absence of Si—O—C bonds in the molecule. Representative such surfactants are the non-hydrolyzable silicon-glycol copolymers which are described in the *Journal of Cellular Plastics*, March/April, 1973 issue, pages 99–102; and the siloxane-polyether urethane copolymers, described in U.S. Pat. No. 3,246,048. The entire disclosure of both these references are incorporated herein by reference.

The silicon-based surfactant is typically employed in a proportion from about 0.5 to about 5 parts per every 100 parts by weight of prepolymer in the reaction mixture. This is in order to prevent the foam from collapsing, when too little surfactant is used, and also to avoid foam shrinkage when too high a level of the surfactant is used. A preferred surfactant level is about 1–2.5 parts per 100 parts by weight of prepolymer.

In addition to the above, the reaction mixture may include other ingredients, if desired, which serve a certain function or impart certain properties to the foam. This includes, for example, pigments, dyes, fragrances, abrasives, flame retardant additives, fibers, fillers and so forth.

The polyurethane foam of the present invention is prepared by adding a suitable proportion of water, within the range defined above, to the prepolymer, and then mixing the two reactants together. The nonionic surfactant, the quaternary ammonium compound, the silicon-based surfactant, and optionally the other ingredients as discussed above are added to the reaction mixture, prior to foam formation. This can generally be carried out by combination with the water reactant. Alternatively, the various additives can be introduced into the reaction mixture via separate streams.

Polyurethane foams made according to the invention have a fine, as opposed to a coarse, cell structure. They are further characterized as being flexible. As such, the foams of the invention are highly suitable, from a practical and economic standpoint, for use in household applications. By virtue of the additives employed, the foams demonstrate satisfactory cleaning and germicidal activities. Furthermore, the foams have a good, soft feel and are also characterized by suitable tear strength, tensile strength and elongation properties.

The following examples are provided to illustrate the invention. Further in the examples, all parts are by weight based on 100 parts by weight of the prepolymer in the reaction mixture.

EXAMPLE 1

A polyurethane foam was made on a Martin-Sweets foam machine having a capacity of 150 lb./min., using the following ingredients in the indicated proportions:

| Ingredients | Parts by Weight |
| --- | --- |
| Prepolymer [1] | 100 |
| Water | 70 |
| Nonionic surfactant [2] | 6.9 |
| Quaternary ammonium compound [3] | 2.3 |
| Silicon-based surfactant [4] | 2.0 |
| Fragrance | 1.2 |
| Dye | 0.9 |

[1] A prepolymer derived from polyethylene glycol, trimethylolpropane and excess toluene diisocyanate and having a molecular weight of about 2,000–2,500. Commercially available from W. R. Gace & Co. under the designation "Hypol 3000".

[2] Commercially available nonyl phenoxy polyethoxyethanol from Olin Corporation under the designation "Poly-Tergent® B-300".

[3] Commercially available mixture of ($C_{12}$–$C_{18}$) dimethyl benzyl ammonium chlorides and ($C_{12}$–$C_{18}$) dimethyl ethylbenzyl ammonium chlorides (50% active solution) from Onyx Chemical Company under the designation "BTC 2125M".

[4] Commercially available silcon-glycol copolymer from Union Carbide Corporation under the designation "L-562".

EXAMPLE 2

A polyurethane foam was prepared, using standard hand-mix procedures, from the following ingredients in the indicated proportions:

| Ingredients | Parts by Weight |
| --- | --- |
| Prepolymer [1] | 100 |
| Water | 70 |
| Nonionic surfactant [2] | 6.6 |
| Quaternary ammonium compound [3] | 1.5 |

| Ingredients | Parts by Weight |
|---|---|
| Silicon-based surfactant [4] | 1.0 |
| Fragrance | 1.1 |
| Dye | 0.9 |

[1] A prepolymer derived from polyethylene glycol, trimethylolpropane and excess toluene diisocyanate and having a molecular weight of about 2,000–2,500. Commercially available from W. R. Gace & Co. under the designation "Hypol 3000".
[2] Commercially available nonyl phenoxy polyethoxyethanol from Olin Corporation under the designation "Poly-Tergent® B-300".
[3] Commercially available mixture of ($C_{12}$-$C_{18}$) dimethyl benzyl ammonium chlorides and ($C_{12}$-$C_{18}$) dimethyl ethylbenzyl ammonium chlorides (50% active solution) from Onyx Chemical Company under the designation "BTC 2125M".
[4] Commercially available silcon-glycol copolymer from Union Carbide Corporation under the designation "L-562".

EXAMPLE 3

A polyurethane foam was prepared, using standard hand-mix procedures, from the following ingredients in the indicated proportions:

| Ingredients | Parts by Weight |
|---|---|
| Prepolymer [1] | 100 |
| Water | 70 |
| Nonionic surfactant [2] | 6.9 |
| Quaternary ammonium compound [3] | 2.3 |
| Silicon-based surfactant [4] | 1.0 |
| Fragrance | 1.2 |
| Dye | 0.9 |

[1] A prepolymer derived from polyethylene glycol, trimethylolpropane and excess toluene diisocyanate and having a molecular weight of about 2,000–2,500. Commercially available from W. R. Gace & Co. under the designation "Hypol 3000".
[2] Commercially available nonyl phenoxy polyethoxyethanol from Olin Corporation under the designation "Poly-Tergent® B-300".
[3] Commercially available mixture of ($C_{12}$-$C_{18}$) dimethyl benzyl ammonium chlorides and ($C_{12}$-$C_{18}$) dimethyl ethylbenzyl ammonium chlorides (50% active solution) from Onyx Chemical Company under the designation "BTC 2125M".
[4] Commercially available silcon-glycol copolymer from Union Carbide Corporation under the designation "L-562".

EXAMPLE 4

The polyurethane foam of Example 3 was then tested for activity against various microorganisms in nutrient agar medium. The results of these tests are set forth in Table I below.

In carrying out the tests, the following procedure was followed: The polyurethane foam was held under running tap water (flow rate: 4 liters/min.; temperature: 25°–30° C.) and squeezed. After squeezing once, samples (1 sq. in.) were removed by holding the foam with forceps and cutting it with shears. Samples were subsequently removed from additional foam pieces after 5, 10, 15 and 20 squeezes, a new foam piece being used for each series of squeezes. The samples were then pressed gently onto the surface of inoculated agar plates which had been allowed to harden. The plates were incubated at 37° C. for 48 hours, and then examined for zones of inhibition surrounding the sample, which would indicate the residual germicidal activity for the foam.

TABLE I

Activity Against *Staphylococcus aureus* and *Klebsiella pneumoniae*

| Number of Squeezes [1] | *Staphylococcus aureus* Zone | Size [2] (mm) | *Klebsiella pneumoniae* Zone | Size [2] (mm) |
|---|---|---|---|---|
| 1 | Yes | 9 | Yes | 7 |
| 5 | Yes | 7 | Yes | 6 |
| 10 | Yes | 7 | Yes | 4 |
| 15 | Yes | 5 | Yes | 3 |
| 20 | Yes | 4 | Yes | 3 |

[1] Number of squeezes prior to testing.
[2] Size in mm of zone in which no microorganisms were detected (average of 5 samples tested).

What is claimed is:

1. In a polyurethane foam prepared by mixing together
   (a) a prepolymer of a hydrophilic oxyalkylene polyol which is capped with isocyanate groups, and
   (b) from about 20 to about 100 parts, based on 100 parts by weight of said prepolymer, of water,
   wherein the improvement comprises adding to said mixture prior to foam formation,
   (c) from about 0.5 to about 10 parts, based on 100 parts by weight of said prepolymer, of a nonionic surfactant,
   (d) from about 0.5 to about 5 parts, based on 100 parts by weight of said prepolymer, of a quaternary ammonium compound, and
   (e) from about 0.5 to about 5 parts, based on 100 parts by weight of said prepolymer, of a silicon-based surfactant,
   whereby there is obtained a fine cell, hydrophilic foam having cleaning and germicidal activities.

2. The polyurethane foam of claim 1, wherein said prepolymer is made from a polyalkylene glycol, a polyhydric alcohol having 3 to 4 hydroxyl groups and excess toluene diisocyanate.

3. The polyurethane foam of claim 1, wherein said nonionic surfactant is an alkylphenol ethylene oxide condensate.

4. The polyurethane foam of claim 1, wherein said quaternary ammonium compound has the formula

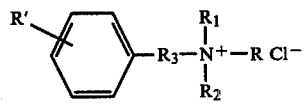

wherein $R_1$, $R_2$ and $R_3$ are independently selected from the group consisting of $C_1$–$C_4$ alkyl, R' is selected from the group consisting of hydrogen and $C_1$–$C_4$ alkyl and R is selected from the group consisting of $C_{12}$–$C_{18}$ alkyl.

5. The polyurethane foam of claim 1, wherein water is employed in a proportion from about 40 to about 80 parts, said nonionic surfactant is employed in a proportion from about 3 to about 7.5 parts, said quaternary ammonium compound is employed in a proportion from about 1.5 to about 3 parts, and said silicon-based surfactant is employed in a proportion from about 1 to about 2.5 parts, all such proportions being based on 100 parts by weight of said prepolymer.

6. The polyurethane foam of claim 5, wherein said prepolymer is made from polyethylene glycol, trimethylolpropane and excess toluene diisocyanate.

7. The polyurethane foam of claim 6, wherein said nonionic surfactant is nonyl phenoxy polyethoxyethanol.

8. The polyurethane foam of claim 7, wherein said quaternary ammonium compound is a mixture of n-alkyl ($C_{12}$–$C_{18}$) dimethyl benzyl ammonium chlorides and n-alkyl ($C_{12}$-$C_{18}$) dimethyl ethylbenzyl ammonium chlorides.

9. The polyurethane foam of claim 8, further including a fragrance and a dye.

10. In a method of preparing a polyurethane foam by mixing together
   (a) a prepolymer of a hydrophilic oxyalkylene polyol which is capped with isocyanate groups, and
   (b) from about 20 to about 100 parts, based on 100 parts by weight of said prepolymer, of water,
wherein the improvement comprises adding to said mixture prior to foam formation,
   (c) from about 0.5 to about 10 parts, based on 100 parts by weight of said prepolymer, of a nonionic surfactant,
   (d) from about 0.5 to about 5 parts, based on 100 parts by weight of said prepolymer, of a quaternary ammonium compound, and
   (e) from about 0.5 to about 5 parts, based on 100 parts by weight of said prepolymer, of a silicon-based surfactant,
whereby there is obtained a fine cell, hydrophilic foam having cleaning and germicidal activities.

11. The method of claim 10, wherein said prepolymer is made from a polyalkylene glycol, a polyhydric alcohol having 3 to 4 hydroxyl groups and excess toluene diisocyanate.

12. The method of claim 10, wherein said nonionic surfactant is an alkylphenol ethylene oxide condensate.

13. The method of claim 10, wherein said quaternary ammonium compound has the formula

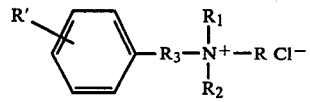

wherein $R_1$, $R_2$ and $R_3$ are independently selected from the group consisting of $C_1$-$C_4$ alkyl, $R'$ is selected from the group consisting of hydrogen and $C_1$-$C_4$ alkyl and R is selected from the group consisting of $C_{12}$-$C_{18}$ alkyl.

14. The method of claim 10, wherein water is employed in a proportion from about 40 to about 80 parts, said nonionic surfactant is employed in a proportion from about 3 to about 7.5 parts, said quaternary ammonium compound is employed in a proportion from about 1.5 to about 3 parts, and said silicon-based surfactant is employed in a proportion from about 1 to about 2.5 parts, all such proportions being based on 100 parts by weight of said prepolymer.

15. The method of claim 14, wherein said prepolymer is made from polyethylene glycol, trimethylolpropane and excess toluene diisocyanate.

16. The method of claim 15, wherein said nonionic surfactant is nonyl phenoxy polyethoxyethanol.

17. The method of claim 16, wherein said quaternary ammonium compound is a mixture of n-alkyl ($C_{12}$-$C_{18}$) dimethyl benzyl ammonium chlorides and n-alkyl ($C_{12}$-$C_{18}$) dimethyl ethylbenzyl ammonium chlorides.

18. The method of claim 17, further including in said mixture a fragrance and a dye.

* * * * *